US012804599B2

(12) United States Patent
Alpert et al.

(10) Patent No.: US 12,804,599 B2
(45) **Date of Patent: *Nov. 17, 2026**

(54) INCOMING TRANSMISSION AWARENESS FOR BLUETOOTH DEVICES

(71) Applicant: Texas Instruments Incorporated, Dallas, TX (US)

(72) Inventors: Yaron Alpert, Hod Hasharon (IL); Maxim Altshul, Hod Hasharon (IL); Maital Hahn, Petach-Tikva (IL)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/672,287

(22) Filed: May 23, 2024

(65) Prior Publication Data

US 2024/0314731 A1 Sep. 19, 2024

Related U.S. Application Data

(63) Continuation of application No. 17/236,598, filed on Apr. 21, 2021, now Pat. No. 12,035,275.

(51) Int. Cl.

*H04W 68/00* (2009.01)
*H04W 4/23* (2018.01)
*H04W 4/80* (2018.01)

(52) U.S. Cl.

CPC ........... *H04W 68/005* (2013.01); *H04W 4/23* (2018.02); *H04W 4/80* (2018.02)

(58) Field of Classification Search

CPC ....... H04W 68/005; H04W 4/23; H04W 4/80; H04M 2250/02

See application file for complete search history.

(56) References Cited

U.S. PATENT DOCUMENTS

| | | | | |
|---|---|---|---|---|
| 12,035,275 | B2 * | 7/2024 | Alpert | H04W 4/80 |
| 2011/0021142 | A1 * | 1/2011 | Desai | H04W 4/80 455/41.2 |
| 2014/0360232 | A1 * | 12/2014 | Al-Kahwati | G07C 9/00571 70/14 |
| 2014/0364089 | A1 * | 12/2014 | Lienhart | H04W 4/12 455/412.2 |
| 2016/0055116 | A1 * | 2/2016 | Duer | H04W 4/80 710/105 |
| 2016/0135026 | A1 * | 5/2016 | Liang | H04W 4/21 455/456.1 |
| 2016/0249356 | A1 * | 8/2016 | Pope | H04W 52/0216 |
| 2016/0286340 | A1 * | 9/2016 | Zhu | H04L 63/0428 |
| 2017/0006415 | A1 * | 1/2017 | Song | H04W 4/80 |
| 2017/0318612 | A1 * | 11/2017 | Gu | H04W 52/0206 |
| 2018/0239444 | A1 * | 8/2018 | Siddiqui | G06F 1/3215 |
| 2019/0045421 | A1 * | 2/2019 | Shah | H04W 40/02 |
| 2019/0103914 | A1 * | 4/2019 | Junk | H04W 4/80 |

(Continued)

*Primary Examiner* — Benjamin H Elliott, IV

(74) *Attorney, Agent, or Firm* — Michelle F. Murray; Charles Koch

(57) ABSTRACT

A Bluetooth (BT) or Bluetooth Low Energy (BLE) controller includes: a physical (PHY) layer; a baseband radio frequency (RF) layer; and a link layer (LL). The LL is configured to: obtain an incoming transmission awareness request regarding a later incoming transmission event; and perform incoming transmission operations to prepare for the later incoming transmission event responsive to the incoming transmission awareness request.

21 Claims, 5 Drawing Sheets

(56) References Cited

U.S. PATENT DOCUMENTS

| | | | | |
|---|---|---|---|---|
| 2020/0137745 | A1* | 4/2020 | Bachu | H04L 69/321 |
| 2020/0220962 | A1* | 7/2020 | Neely | H04M 1/72406 |
| 2020/0279279 | A1* | 9/2020 | Chaudhuri | G06N 5/04 |
| 2020/0288289 | A1* | 9/2020 | Elnajjar | G06Q 30/0265 |
| 2022/0346058 | A1* | 10/2022 | Alpert | H04W 4/80 |
| 2024/0314731 | A1* | 9/2024 | Alpert | H04W 4/80 |

* cited by examiner

FIG. 2
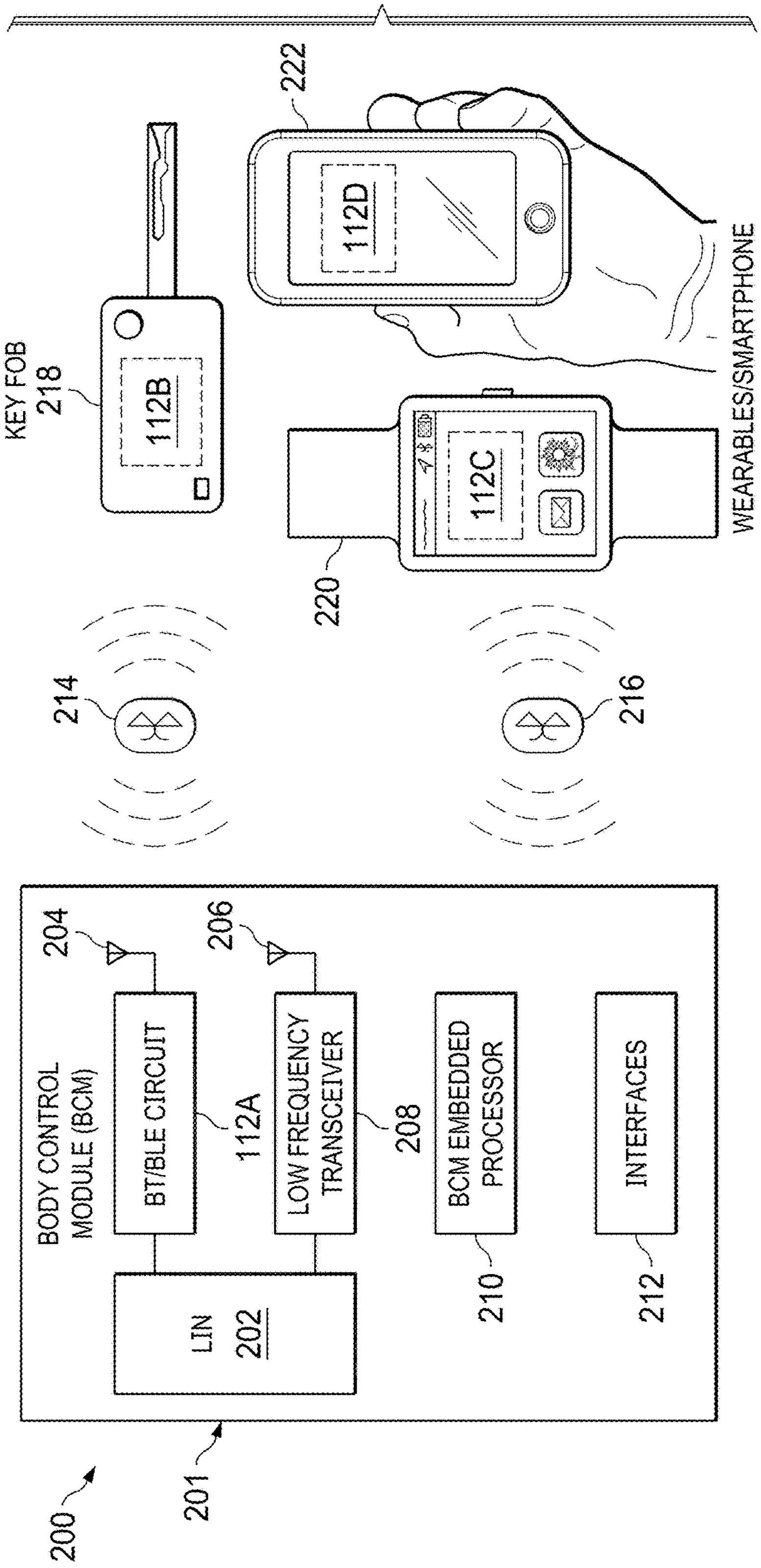
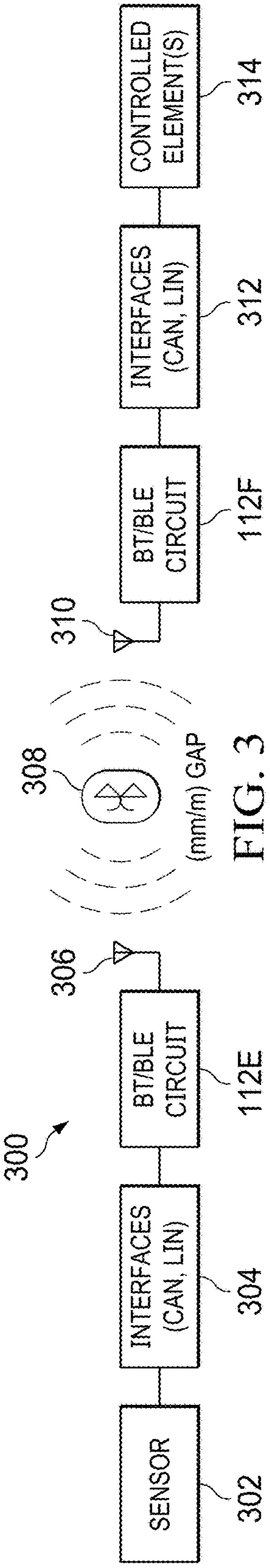
FIG. 3

INCOMING TRANSMISSION AWARENESS FOR BLUETOOTH DEVICES

CROSS-REFERENCE TO RELATED APPLICATIONS

This application is a continuation of U.S. patent application Ser. No. 17/236,598, filed Apr. 21, 2021, which application is hereby incorporated herein by reference.

BACKGROUND

As new electronic devices are developed and integrated circuit (IC) technology advances, new IC products are commercialized. One example IC product for electronic devices is a Bluetooth Low Energy (BLE) controller. The BLE standard defines a hierarchy of layers and components to be implemented by each electronic device to support low power wireless communications. The bottom layer defined by the BLE standard is the BLE controller, which includes a physical (PHY) layer and a radio frequency (RF) layer. Above the BLE controller is the BLE host. Above the BLE host layer resides an application layer with applications configured to send or receive data via the BLE host layer and BLE controller layer. BLE devices communicate at constant intervals on channels known as BLE Data Channels. Each data channel has a unique band between 2.4 GHz and 2.4835 GHz, and each of those channels has unique frequency-dependent characteristics.

The BLE controller is responsible for taking care of all tasks needed for the connection to stay active. Example BLE controller tasks include hopping between wireless channels using a preconfigured channel list. For most BLE use scenarios, hopping between wireless channels is an advantage. However, in some BLE use scenarios, greater control over the wireless channel to be used, the timing, or other BLE features is desirable to reduce power consumption, to reduce delays, and/or to improve other performance metrics. In the current Bluetooth and BLE standards, the receiving device is not aware of specific incoming transmissions and thus cannot change the channel/timing/content options.

SUMMARY

In one example embodiment, a Bluetooth (BT) or Bluetooth Low Energy (BLE) controller comprises: a physical (PHY) layer; a baseband radio frequency (RF) layer; and a link layer (LL). The LL is configured to: obtain an incoming transmission awareness request regarding a later incoming transmission event; and perform incoming transmission operations to prepare for the later incoming transmission event responsive to the incoming transmission awareness request.

In another example embodiment, a Bluetooth (BT) or Bluetooth Low Energy (BLE) device comprises: an application layer; a host layer; and a controller layer. The controller layer is configured to: obtain an incoming transmission awareness request from the application layer or the host layer regarding a later incoming transmission event; and perform incoming transmission operations to prepare for the later incoming transmission event responsive to the incoming transmission awareness request.

In yet another example embodiment, a method performed by a Bluetooth (BT) or Bluetooth Low Energy (BLE) device comprises obtaining, by a first entity of the BT or BLE device, an incoming transmission awareness request regarding a later incoming transmission event. The method also comprises receiving, by a second entity of the BT or BLE device, the incoming transmission awareness request or a notification regarding the incoming transmission awareness request. The method also comprises performing incoming transmission operations, by the first entity or the second entity, to prepare for the later incoming transmission event responsive to the incoming transmission awareness request.

BRIEF DESCRIPTION OF THE DRAWINGS

FIG. 2 is a diagram of a system with BT/BLE and incoming transmission awareness in accordance with an example embodiment.

FIG. 3 is a diagram of another system with BT/BLE and incoming transmission awareness in accordance with an example embodiment.

DETAILED DESCRIPTION

Figure 1:
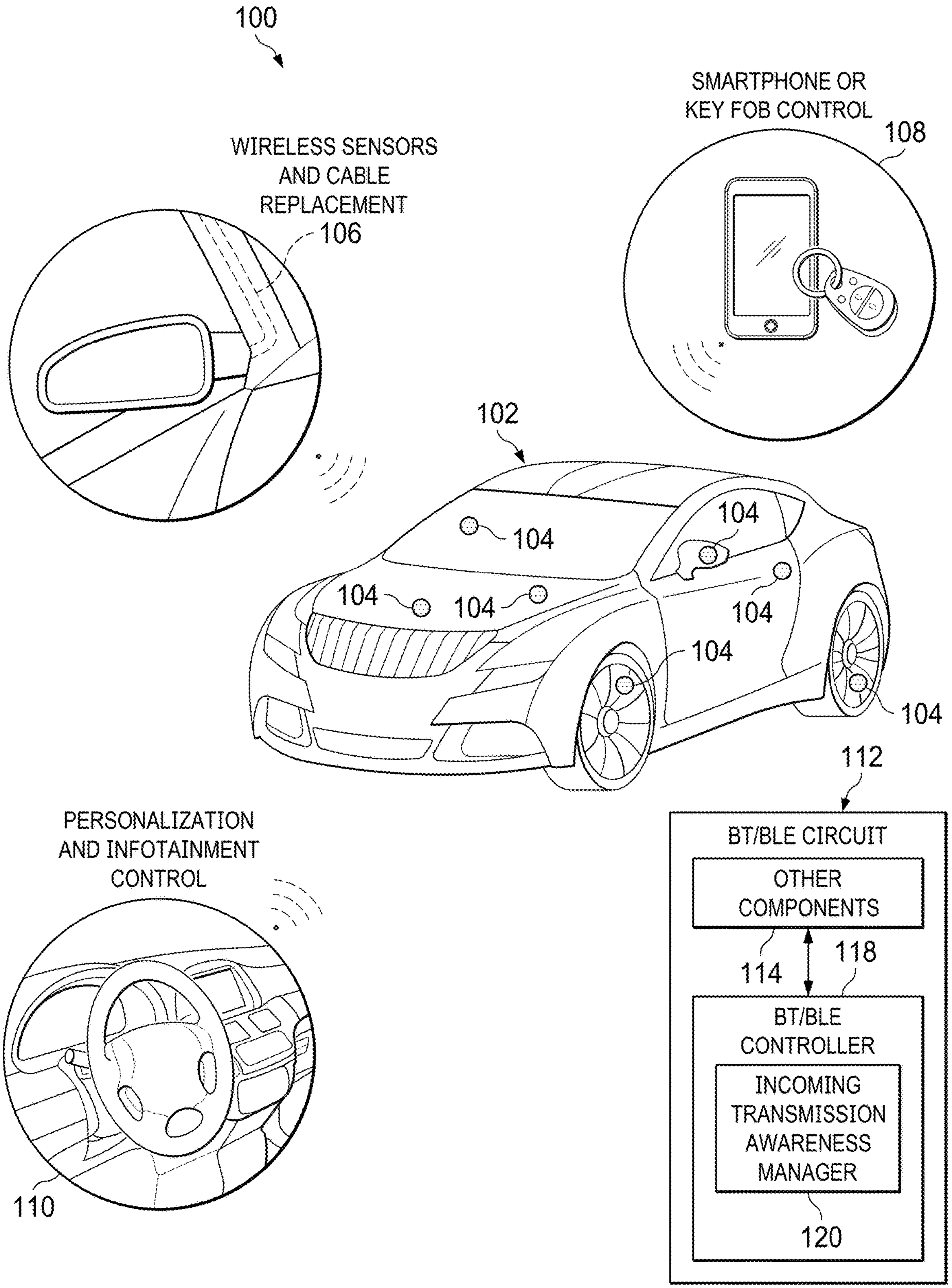
FIG. 1 is a diagram of a vehicle with Bluetooth (BT) or Bluetooth Low Energy (BLE) and incoming transmission awareness in accordance with an example embodiment.

Described herein is a Bluetooth (BT) or Bluetooth Low Energy (BLE) controller that supports incoming transmission awareness. The BT/BLE controller is a circuit, such as an integrated circuit (IC) or part of an IC. Such BT/BLE controllers include a physical layer (PHY) and a baseband radio frequency (RF) layer (sometimes referred to as the RF layer herein), and are used in electronic devices to support short-range wireless communications in accordance with the BT/BLE standards. The incoming transmission awareness capability described herein is an enhanced feature that is compatible with, but not currently defined for, the BT/BLE standards. Example electronic devices that may include a BT/BLE controller with incoming transmission awareness are: vehicles, sensors, smartphones, key fobs, infotainment units, computers, laptops, ICs, or other electronic devices. Such electronic devices are sometimes referred to herein as BT/BLE devices. For the sake of clarity, such BT/BLE devices are sometimes delineated herein as receiving (RX) BT/BLE devices or transmitting (TX) BT/BLE devices.

With incoming transmission awareness, an RX BT/BLE device or related entities (e.g., application, host, or controller layer entities of an RX BT/BLE device) has awareness of a later incoming transmission event and can perform incoming transmission operations to prepare for the later incoming transmission event. In some example embodiments, the incoming transmission operations include selecting receive parameters for the later incoming transmission event. Example receive parameters include specific packet information, specific channel information, specific timing information (e.g., start time or interval length), recaption configuration, modem/PHY parameters, RF layer parameters, logical link (L2) parameters, restrictions and/or other parameters for the later incoming transmission event.

In one example embodiment, incoming transmission awareness involves dedicated configuration signaling between entities of an RX BT/BLE device (e.g., between application and host entities of an RX BT/BLE device, and/or between host and controller entities of an RX BT/BLE device) to characterize the later incoming transmission event or related receive parameters, using application programming interface (API) signaling. The dedicated configuration signaling between entities of an RX BT/BLE device enables these entities to communicate regarding a later incoming transmission event, related requests, notifications, receive parameters, confirmations, and/or other incoming transmission awareness options.

In some example embodiments, incoming transmission awareness for an RX BT/BLE device involves the following operations: 1) a first entity of an RX BT/BLE device obtains an incoming transmission awareness request for a specific later incoming transmission event; 2) the first entity sends the incoming transmission awareness request or a related notification to a second entity of the RX BT/BLE device; and 3) the first or second entities of the RX BT/BLE device perform operations to prepare for the later incoming transmission event in accordance with the incoming transmission awareness request. Example operations include selecting receive parameters (e.g., specific packet information, a specific channel, specific timing, and/or specific recaption configuration for PHY and baseband RF layers related to the request) for the later incoming transmission event. Other example operations include providing notification once preparation for the later incoming transmission event is complete, providing notification once the later incoming transmission event starts or ends, or providing notification if there is a failure with regard to preparation for or handling of the later incoming transmission event. The BT/BLE stack described herein is hierarchical with higher and lower entities. The highest entities of the BT/BLE stack are application entities. Host entities are below the application entities, and controller entities are the lowest entities of the BT/BLE stack. In some example embodiments, the first entity is a higher entity of the BT/BLE stack compared to the second entity. In other example embodiments, the first entity is a lower entity BT/BLE stack compared to the second entity.

In some example embodiments, incoming transmission awareness for RX BT/BLE devices involves the RX BT/BLE advertising preferences/recaption capabilities for the later incoming transmission event. Another option for incoming transmission awareness involves specific incoming transmission event coordination between an RX BT/BLE device and a TX BT/BLE device. Such coordination can be initiated by the RX BT/BLE device or the TX BT/BLE device. As desired, confirmation of coordination can be performed as well. Another option for incoming transmission awareness involves an external source (e.g., a user or application) providing receive parameters for a later incoming transmission event via an external source interface compatible with the BT/BLE stack.

In different example embodiments, the incoming transmission awareness request may be for periodic events, a one-time immediate event, or triggered events (e.g., triggering criteria may be included with the request). In different example embodiments, the incoming transmission awareness request involves: a push request from one entity and an event completed indication from another entity; and/or pulling a status update for the incoming transmission event from an entity.

FIG. 1 is a diagram 100 of a vehicle 102 with BT or BLE devices 104 and incoming transmission awareness in accordance with an example embodiment. Although a car is shown for FIG. 1, it should be understood that BT/BLE and incoming transmission awareness could be used with another vehicle (e.g., air vehicles, marine vehicles, etc.) or within a building (e.g., a home, office, or manufacturing setting). Without limitation, the BT or BLE devices 104 are distributed throughout the vehicle 102 as desired to provide a network of wireless communication nodes between wired communication networks, sensors, displays, analysis and control systems, processors, etc. The diagram 100 also shows example BT or BLE use scenarios 106, 108, and 110 for the vehicle 102, as well as an example BT/BLE device circuit 112, which represents an IC or other circuit included with each of the BT/BLE devices 104. As shown, the BT or BLE circuit 112 includes a BT/BLE controller 118 with an incoming transmission awareness manager 120. The incoming transmission awareness manager 120 represents hardware (e.g., PHY and RF layers), software, and/or instructions configured to perform incoming transmission awareness operations as described herein. The BT or BLE circuit 112 also includes other components 114 (e.g., higher layers with other components and peripherals) coupled to the BT/BLE controller 118. In one example embodiment, the other components 114 include a processor and memory to execute applications, to prepare data packets for transmission via a wireless communication channel, to store or process data packets received via a wireless communication channel, and/or other components. Additionally or alternatively, the other components 114 include sensors, actuators, electronic drivers or controllers, and/or other components that collect data, analyze data, generate control signals, and/or respond to control signals. In some example embodiments, the other components 114 may be external to the BT/BLE circuit 112, where the BT/BLE circuit 112 provides the functionality of wireless communications for the other components 114. With the BT/BLE circuit 112, one or more BT/BLE devices 104 of the vehicle 102 is able to perform the incoming transmission awareness operations described herein.

In FIG. 1, the various BT or BLE use scenarios 106, 108, and 110 are example scenarios in which incoming transmission awareness operations could be performed. The BT or BLE use scenario 106 represents wireless sensor and cable replacement operations. The BT or BLE use scenario 108 represents smartphone and key fob control operations 108. The BT or BLE use scenario 110 represents personalization and infotainment control operations. In each of the BT or BLE use scenarios 106, 108, and 110, one or more BT or BLE devices 104 is used to transmit or receive information via a wireless communication channel. As desired, a given BT or BLE device 104 performs incoming transmission awareness operations as described herein to improve In FIG. 1, the BT or BLE circuit 112 is included with any or all of the BT or BLE devices 104. In some example embodiments, the BT or BLE circuit 112 is an IC (or other circuit) with a BT/BLE controller 118 having an incoming transmission awareness manager 120. The incoming transmission awareness manager 120 for the BT/BLE controller 118 represents hardware (e.g., PHY and RF layers), software, and/or instructions to perform incoming transmission awareness operations as described herein. The BT or BLE circuit 112 also includes other components 114 (e.g., higher layers with other components and peripherals) coupled to the BT/BLE controller 118. In one example embodiment, the other components 114 includes a processor and memory to execute applications, to prepare data packets for transmission via a wireless communication channel, and/or to store or process data packets received via a wireless communication channel. Additionally or alternatively, the other components 114 include sensors, actuators, electronic drivers or controllers, and/or other components that collect data, analyze data, generate control signals, and/or respond to control signals. In some example embodiments, the other components 114 may be external to the BT/BLE circuit 112, where the BT/BLE circuit 112 provides the functionality of wireless communications for the other components 114. With the BT/BLE circuit 112, one or more BT/BLE devices 104 of the vehicle 102 is able to perform incoming transmission awareness operations. Example benefits of incoming transmission awareness include: increasing the signal-to-noise ratio (SNR); reducing power consumption; reducing the overhead of handling the incoming transmission; improving the response time; and/or other benefits that improve the quality of service (QOS) and user experience.

In the diagram 100, each of the BT/BLE devices 104 may use a respective BT/BLE circuit 112 to operate as an RX BT/BLE device, a TX BT/BLE device, or both. The incoming transmission awareness functionality described herein is performed internally by RX BT/BLE devices. In some example embodiments, the RX BT/BLE device advertises preferences or recaption capabilities for a later incoming transmission event to an TX BT/BLE device. As another option, an RX BT/BLE device or a TX BT/BLE device initiate coordination of a later incoming transmission event. As another option, external configuration preferences (e.g., from a user or application) are provided to prepare the RX BT/BLE for an later incoming transmission event.

FIG. 2 is a diagram of a system 200 with BT/BLE and incoming transmission awareness in accordance with an example embodiment. As shown, the system 200 includes a body control module (BCM) 201 with a local interconnect network (LIN) 202 coupled to various components, including a BT/BLE circuit 112A (an example of the BT/BLE circuit 112 in FIG. 1). In vehicular electronics, BCM is a generic term for an electronic control unit responsible for monitoring and controlling electronic accessories of a vehicle (e.g., drivers or actuators for power windows, power mirrors, interior lights, air conditioning, an immobilizer system, central locking, etc.). As needed, the BCM 201 communicates with other on-board computers via a communication bus, such as a controller area network (CAN) bus, or via wireless communication channels.

Other components coupled to the LIN 202 include a low-frequency transceiver 208, a BCM embedded processor 210, and interfaces 212 (e.g., a CAN interface). In different scenarios, the BCM 201 performs wireless communications using the BT/BLE circuit 112A and a related antenna 204 coupled to the BT/BLE circuit 112A. As another option, the BCM 201 performs wireless communication using the low-frequency transceiver 208 and a related antenna 206 coupled to the low-frequency transceiver 208.

In FIG. 2, the BCM 201 communicates to a key fob 218 having a BT/BLE circuit 112B (an example of the BT/BLE circuit 112 in FIG. 1) via a wireless communication channel 214. Over time, the wireless communication channel 214 varies depending on the position of the key fob 218 relative to the BCM 201. Additionally or alternatively, the BCM 201 communicates to a wearable 220 having a BT/BLE circuit 112C (an example of the BT/BLE circuit 112 in FIG. 1) via a wireless communication channel 216. Again, the wireless communication channel 216 varies over time depending on the position of the wearable 220 relative to the BCM 201. Additionally or alternatively, the BCM 201 communicates to a smartphone 222 having a BT/BLE circuit 112D (an example of the BT/BLE circuit 112 in FIG. 1) via the wireless communication channel 216.

In the system 200, any of the BCM 201, the key fob 218, the wearable 220, or the smartphone 222 is able to perform incoming transmission awareness operations as described herein using their respective BT/BLE circuits 112A, 112B, 112C, and 112D. With incoming transmission awareness, the BCM 201, the key fob 218, the wearable 220, or the smartphone 222 has awareness of a later incoming transmission event and can prepare receive parameters based on preferences, recaption capabilities, or restrictions. Example receive parameters include specific packet information, specific channel information, specific timing information (e.g., start time or interval length), recaption configuration, modem/PHY parameters, RF layer parameters, L2 parameters, restrictions and/or other parameters for the later incoming transmission event. This awareness provides the benefit of increasing the SNR, reducing power consumption, reducing the overhead of handling the incoming transmission, improve the response time, and/or other benefits that improve the quality of service and user experience.

FIG. 3 is a diagram of another system 300 with BT/BLE and incoming transmission awareness in accordance with an example embodiment. The system 300 includes a sensor 302 coupled to a BT/BLE circuit 112E (an example of the BT/BLE circuit 112 in FIG. 1) via interfaces 304. Examples of the sensors 302 includes radar sensors, light sensors, optical sensors, or other sensors. Examples of the interfaces 304 include a LIN interface and/or a CAN interface. As shown, the BT/BLE circuit 112E is coupled to an antenna 306 for transmitting data to and/or receiving data from a wireless communication channel 308.

In FIG. 3, there is another BT/BLE circuit 112F (an example of the BT/BLE circuit 112 in FIG. 1) coupled to an antenna 310 for transmitting data to and/or receiving data from the wireless communication channel 308. In some example embodiments, the wireless communication channel 308 or space between the antennas 306 and 310 has a size ranging between 1 mm and a few meters (e.g., 1-2 m). The BT/BLE circuit 112F is coupled to controlled element(s) 314 via interface 312 (e.g., LIN and/or CAN interfaces). Examples of the controlled element(s) 314 include drivers or actuators for power windows, power mirrors, interior lights, air conditioning, an immobilizer system, central locking, and/or other controlled elements.

In the system 300, the BT/BLE circuit 112E and/or the BT/BLE circuit 112F is able to perform incoming transmission awareness operations as described herein. With incoming transmission awareness, the BT/BLE circuit 112E and/or the BT/BLE circuit 112F has awareness of parameters for a later incoming transmission event. has awareness of a later incoming transmission event and can prepare receive parameters based on preferences, recaption capabilities, or restrictions. Example receive parameters include specific packet information, specific channel information, specific timing information (e.g., start time or interval length), recaption configuration, modem/PHY parameters, RF layer parameters, L2 parameters, restrictions and/or other parameters for the later incoming transmission event. This awareness provides the benefit of increasing the SNR, reducing power consumption, reducing the overhead of handling the incoming transmission, improve the response time, and/or other benefits that improve the quality of service and user experience. Although FIGS. 1-3 give a description of BT/BLE use related to vehicles, it should be understood that there are other BT/BLE use scenarios (e.g., home/office/industrial/manufacturing use scenarios) that could use and benefit from incoming transmission awareness as described herein.

Figure 4:
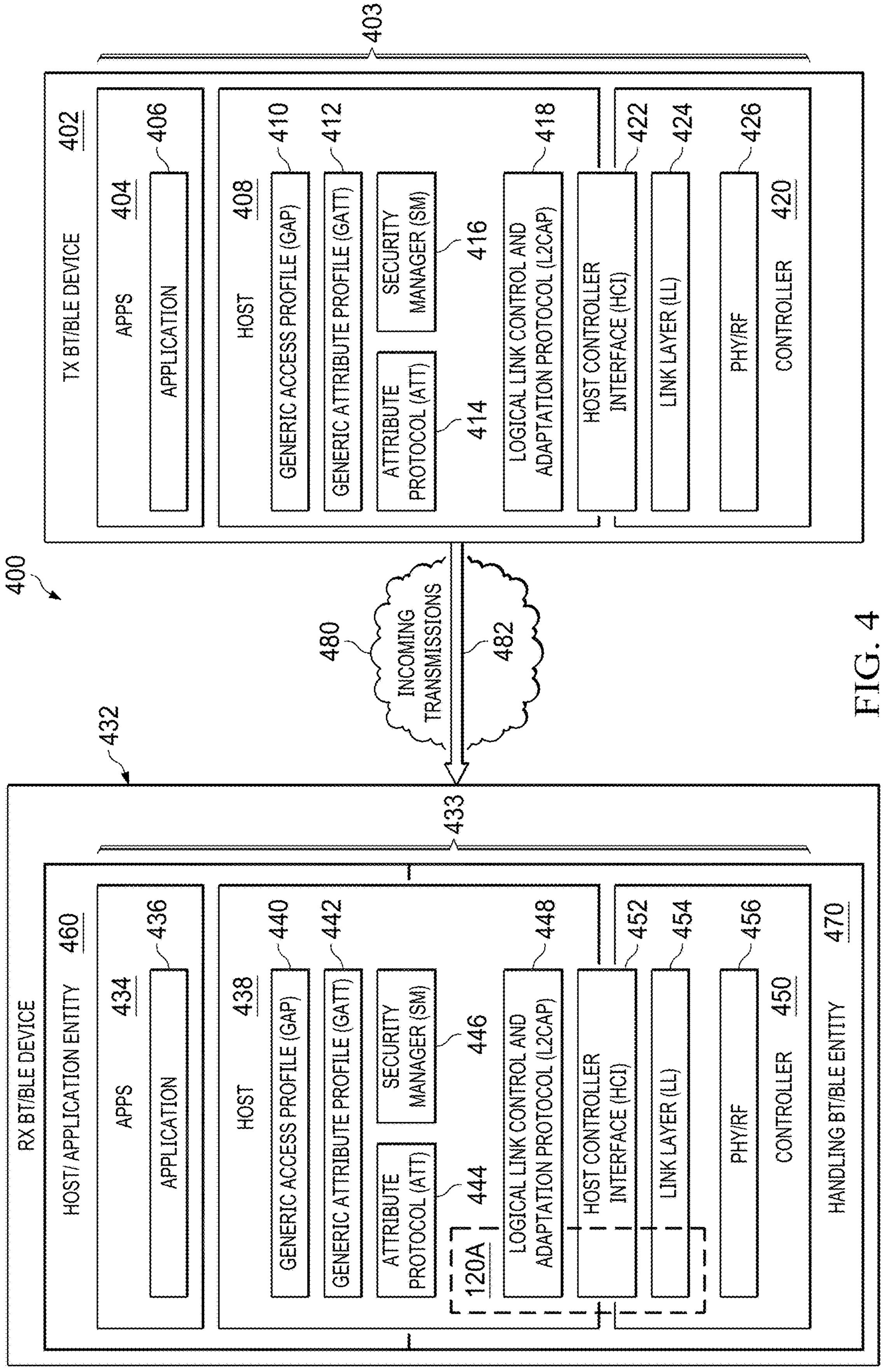
FIG. 4 is a block diagram of an incoming transmission awareness scenario in accordance with an example embodiment.

FIG. 4 is a block diagram of an incoming transmission awareness scenario 400 in accordance with an example embodiment. In the scenario 400, an RX BT/BLE device

432 (e.g., one of the BT or BLE devices 104 in FIG. 1, the BCM 201, the key fob 218, the wearable 220, the smartphone 222 in FIG. 2, or other device with a BT/BLE circuit 112) is in communication with a TX BT/BLE device 402 (e.g., another of the BT or BLE devices 104 in FIG. 1, the BCM 201, the key fob 218, the wearable 220, the smartphone 222 in FIG. 2, or other device with a BT/BLE circuit 112) via a wireless communication channel 480. In the scenario 400, incoming transmissions 482 are received by the RX BT/BLE device 432 from the TX BT/BLE device 402 via the wireless communication channel 480.

In the example of FIG. 4, the TX BT/BLE device 402 includes a BT/BLE stack 403 with an application layer 404, a host layer 408, and a controller layer 420. The application layer 404 includes one or more applications 406 executed by the TX BT/BLE device 402. The host layer 408 includes a generic access profile (GAP) 410, a generic attribute profile (GATT) 412, an attribute protocol (ATT) 414, a security manager (SM) 416, and a logic link control and adaptation protocol (L2CAP) 418. The controller layer 420 includes a link layer (LL) 424 and PHY/RF layers 426. In some example embodiments, the TX BT/BLE device 402 uses dedicated signaling (e.g., API signaling) referred to as host controller interface (HCI) 422 to communicate between the host layer 408 and the controller layer 420.

The RX BT/BLE device 432 includes a BT/BLE stack 433 with an application layer 434, a host layer 438, and a controller layer 450. In some examples, the BT/BLE controller 118 in FIG. 1 includes or is an example of the controller layer 450. The application layer 434 includes one or more applications 436 executed by the RX BT/BLE device 430. The host layer 438 includes GAP 440, GATT 442, ATT 444, SM 446, and L2CAP 448. The controller layer 420 includes LL 454 and PHY/RF layers 456. In some example embodiments, the RX BT/BLE device 430 uses dedicated signaling (e.g., API signaling) referred to as HCI 452 to communicate between the host layer 438 and the controller layer 450. In some example embodiments, the application layer 434 and/or the host layer 438 are in communication with a host/application entity 460. Also, the host layer 438 and/or the controller layer 450 are in communication with a handling BT/BLE entity 470.

As shown, the RX BT/BLE device 430 includes an incoming transmission awareness manager 120A (an example of the incoming transmission awareness manager 120 in FIG. 1). The incoming transmission awareness manager 120A is included with or communicates with the L2CAP 448 and/or the LL 454 to perform incoming transmission awareness operations as described herein. With incoming transmission awareness, the RX BT/BLE device 432 has awareness of a later incoming transmission event (e.g., an instance of the incoming transmissions 482) and can prepare receive parameters for the later incoming transmission event. Example receive parameters include specific packet information, specific channel information, specific timing information (e.g., start time or interval length), recaption configuration, modem/PHY parameters, RF layer parameters, L2 parameters, restrictions and/or other parameters for the later incoming transmission event. This awareness provides the benefit of increasing the SNR, reducing power consumption, reducing the overhead of handling the incoming transmission, improve the response time, and/or other benefits that improve the quality of service and user experience.

Figure 5:
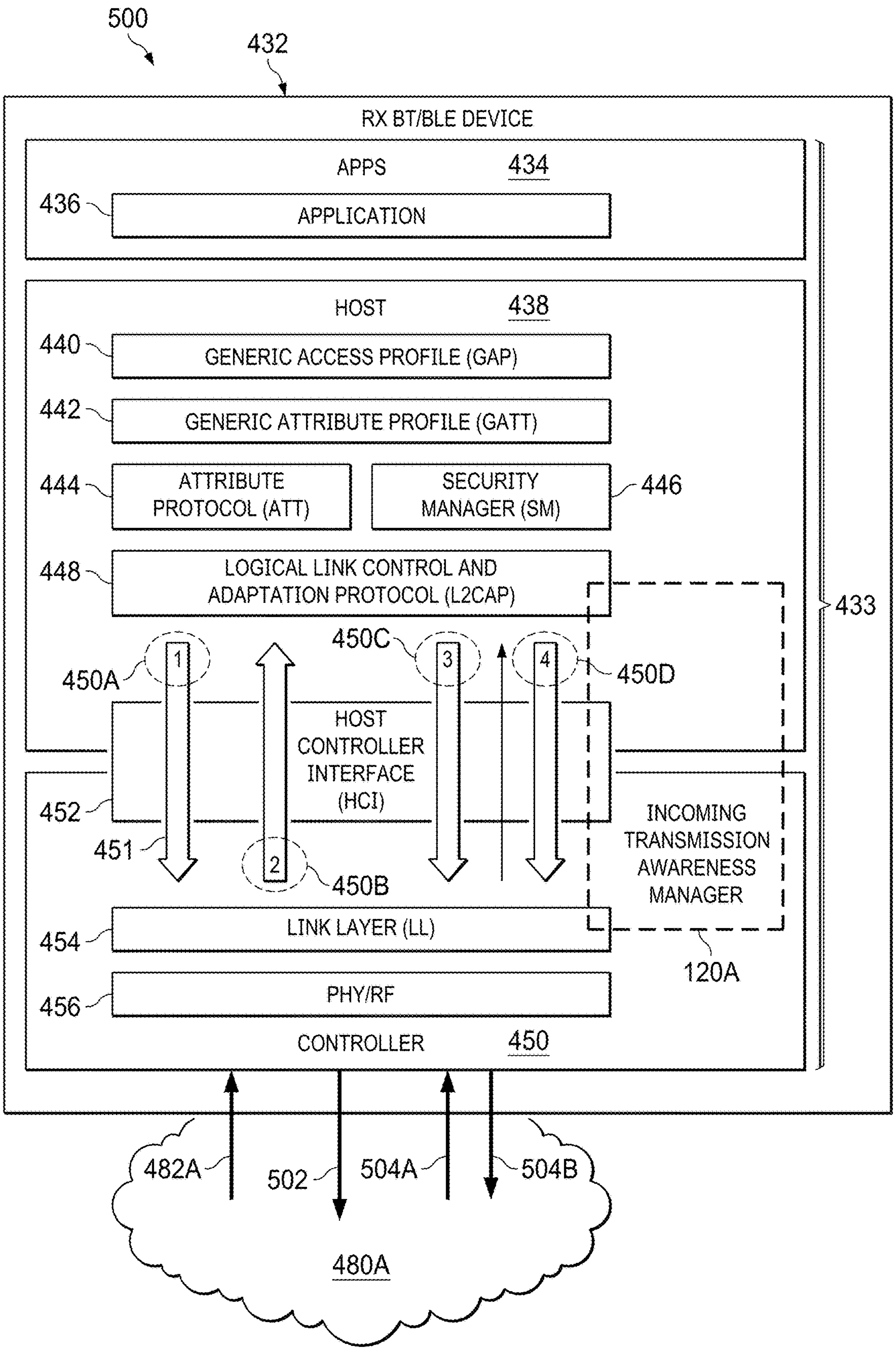
FIG. 5 is a diagram of the receiving (RX) BT/BLE device of FIG. 4 and incoming transmission awareness operations in accordance with an example embodiment.

FIG. 5 is a diagram 500 of the RX BT/BLE device 432 of FIG. 4 and incoming transmission awareness options in accordance with an example embodiment. As shown in the diagram 500, the RX BT/BLE device 430 includes the BT/BLE stack 433 previously described with regard to FIG. 4 and related components. In the example of FIG. 5, the incoming transmission awareness manager 120A supports various incoming transmission awareness operations 450A-450D.

The incoming transmission awareness operation 450A (labeled "1" in FIG. 5) involves the host layer 438 sending an incoming transmission awareness request or indication 451 to the controller layer 450. More specifically, in some example embodiments, the L2CAP 448 of the host layer 438 performs the incoming transmission awareness operation 450A by sending the incoming transmission awareness request or indication 451 to the LL 454 of the controller layer 450. In one example, the incoming transmission awareness request or indication 451 is sent using a dedicated API procedure or other signaling technique to initiate an indication or request regarding a later incoming transmission event to the second entity. Without limitation, the incoming transmission awareness request or indication 451 is initiated or triggered by a first entity (e.g., the host/application entity 460 in FIG. 4) in communication with the host layer 438.

In one example embodiment, the incoming transmission awareness request or indication 451 occurs before or after the RX BT/BLE device 432 advertises preferences and/or recaption capabilities to the TX BT/BLE device 402. The incoming transmission awareness request or indication 451 is used to prepare the RX BT/BLE device 432 for an incoming transmission event that complies with the advertises preferences and/or recaption capabilities of the RX BT/BLE device 432.

In another example embodiment, the incoming transmission awareness request or indication 451 occurs in response to a notification and/or incoming transmission event from the TX BT/BLE device 402. In response to the notification and/or incoming transmission event, the incoming transmission awareness request or indication 451 is used to prepare the RX BT/BLE device 432 for a subsequent incoming transmission event based on coordination information provided with the notification or previous incoming transmission event. In such case, the incoming transmission awareness request or indication 451 may pass from the BT/BLE controller 450 to the BT/BLE host 438.

In still another example embodiment, the incoming transmission awareness request or indication 451 occurs before or after the RX BT/BLE device 432 sends a coordination request to the TX BT/BLE device 402. In such case, the incoming transmission awareness request or indication 451 is used to prepare the RX BT/BLE device 432 for an incoming transmission event after the TX BT/BLE device 402 sends confirmation of the coordinated preferences to be used for the incoming transmission event.

In yet another example embodiment, the incoming transmission awareness request or indication 451 is based on configuration preferences (referred to as external configuration preferences) provided by a user or application of the RX BT/BLE device 432. In such case, the incoming transmission awareness request or indication 451 is used to prepare the RX BT/BLE device 432 for an incoming transmission event that complies with the external configuration preferences to be used for the incoming transmission event.

In all of the above examples, the incoming transmission awareness request or indication 451 may be provided by a first entity to a second entity of the RX BT/BLE device 430. In some example embodiments, the incoming transmission awareness request or indication 451 relates to a specific later incoming transmission event (a one-time incoming transmission, or series of incoming transmissions). Without limitation, the incoming transmission awareness request or indication 451 may include receive parameters or related information. Example receive parameters include specific packet information, specific channel information, specific timing information (e.g., start time or interval length), recaption configuration, modem/PHY parameters, RF layer parameters, L2 parameters, restrictions and/or other parameters for the later incoming transmission event.

In response to the incoming transmission awareness operation 450A and the related incoming transmission awareness request or indication 451, the second entity (e.g., the LL 454) performs an incoming transmission awareness operation 450B (labeled "2" in FIG. 5) related to the incoming transmission awareness request. The incoming transmission awareness operation 450B may involve, for example, receiving an incoming transmission 482A (an example of the incoming transmission event 482 in FIG. 4) or a series of incoming transmissions from a wireless communication channel 480A (an example of the wireless communication channel 480 in FIG. 4) in accordance with receive parameters indicated by the incoming transmission awareness request or indication 451. In different example embodiments, a first entity (e.g., the host/application entity 460 in FIG. 4) of the RX BT/BLE device 432 may use dedicated API signaling or other signaling technique to send the incoming transmission awareness request or indication 451 regarding a specific later incoming transmission event to the second entity (e.g., the handling BT/BLE entity 470 in FIG. 4) of the RX BT/BLE device 432.

In the described technique, the BT/BLE stack 433 is hierarchical with higher and lower entities. The highest entities of the BT/BLE stack 433 are application entities (an example of the host/application entity 460 in FIG. 4). Host entities (another example of the host/application entity 460 in FIG. 4) are below the application entities, and controller entities (an example of the handling BT/BLE entity 470) are the lowest entities of the BT/BLE stack 433. In some example embodiments, the first entity that initiates an incoming transmission awareness request is a higher entity of the BT/BLE stack 433 and the second entity (to handle the request) is a lower entity of the BT/BLE stack 433 relative to the higher entity. In other example embodiments, the first entity that initiates an incoming transmission awareness request is a lower entity of the BT/BLE stack 433 and the second entity is a higher entity of the BT/BLE stack 433 relative to the lower entity. In such case, the first entity handles receive parameters for the later incoming transmission event, and may communicate status or incoming transmission awareness information to the second entity.

In some example embodiments, the incoming transmission awareness manager 120A optionally performs incoming transmission awareness operation 450C (labeled "3" in FIG. 5). With the incoming transmission awareness operation 450C, the RX BT/BLE device 432 advertises preferences 502 for the specific later incoming transmission event related to the incoming transmission awareness request or indication 451. These advertised preferences 502 are then used by a TX BT/BLE device (e.g., the TX BT/BLE device 402 in FIG. 4) for the later incoming transmission event related to the incoming transmission awareness request or indication 451

As another option, the incoming transmission awareness manager 120 enables the RX BT/BLE device 432 to perform incoming transmission awareness operation 450D (labeled "4" in FIG. 5). Without limitation, the incoming transmission awareness operation 450D involves incoming transmission event coordination with a TX BT/BLE device (e.g., the TX BT/BLE device 402 in FIG. 4) responsive to the incoming transmission awareness request or indication 451. In one example, additional signaling 504A and 504B between the RX BT/BLE device 432 and a TX BT/BLE device may be performed via the wireless communication channel 480A after the RX BT/BLE device 432 has advertised preferences 502 regarding a later incoming transmission event. In another example, the additional signaling 504A and 504B between the RX BT/BLE device 432 and a TX BT/BLE device may be performed via the wireless communication channel 480A without advertising. With the incoming transmission awareness operation 450D, coordination of the parameters for the later incoming transmission event is performed whether initiated by the RX BT/BLE device 432 or a TX BT/BLE device.

In different example embodiments, the incoming transmission awareness request or indication 451 initiated by a first entity of the RX BT/BLE device is for periodic events, a one-time immediate event, or triggered events (e.g., triggering criteria may be included with the request or indication 154). In different example embodiments, the incoming transmission awareness request or indication 451 initiated by a first entity involves: a push request and an event completed indication from the second entity; and/or pulling a status update for the later incoming transmission event from the second entity. Without limitation, the later incoming transmission request from the first entity includes: information of a specific packet/info element (data or other) for the event; type of packet/info element (data or other) for the event; timing and frequency of the event; and/or expected incoming transmission characteristics (e.g., radio frequency parameters, modem/PHY parameters, RF layer parameters, L2 parameters, and/or other parameters) for the event. Other examples of incoming transmission awareness operations include: advertising operations by an RX BT/BLE device prior to an incoming transmission event; advertising response operations by a TX BT/BLE device prior to an incoming transmission event; coordination operations initiated by the RX BT/BLE device prior to an incoming transmission event; coordination operations initiated by the TX BT/BLE device prior to an incoming transmission event; transmitting confirmation of coordinated parameters by a RX BT/BLE device; transmitting confirmation of coordinated parameters by a TX BT/BLE device; reporting incoming transmission event completion after an incoming transmission event; reporting incoming transmission event failure; and/or reporting related results to the first entity that initiated the incoming transmission awareness request or indication 451.

Figure 6:
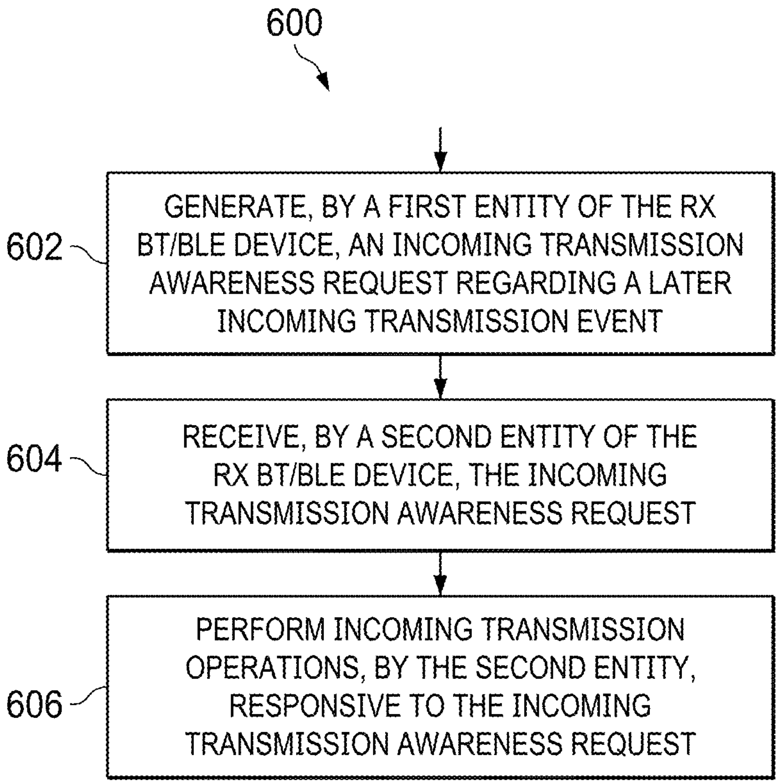
FIG. 6 is a flowchart of an incoming transmission awareness method performed by an RX BT/BLE device.

FIG. 6 is a flowchart of an incoming transmission awareness method 600 performed by an RX BT/BLE device (e.g., the RX BT/BLE device 432 in FIGS. 4 and 5). As shown, the method 600 includes obtaining, by a first entity of the RX BT/BLE device, an incoming transmission awareness request regarding a later incoming transmission event at block 602. At block 604, a second entity of the RX BT/BLE device receives the incoming transmission awareness request. At block 606, incoming transmission operations are performed, by the first or second entity, for the incoming transmission event responsive to the incoming transmission awareness request.

In some example embodiments, the first entity is a host layer entity or an application layer entity, the second entity is a controller layer entity, and the method 600 comprises: generating, by the second entity, the incoming transmission awareness request regarding the later incoming transmission event; receiving, by the first entity, the incoming transmission awareness request; and performing incoming transmission operations, by the second entity, responsive to the incoming transmission awareness request. For example, this set of operations may be performed in response to a notification and/or incoming transmission event from a TX BT/BLE device, where the notification and/or incoming transmission event includes coordination information for a later incoming transmission event.

In some example embodiments, the first entity is a host layer entity or an application layer entity, the second entity is a controller layer entity, and the method 600 comprises: generating, by the first entity, the incoming transmission awareness request regarding the later incoming transmission event; receiving, by the second entity, the incoming transmission awareness request; and performing incoming transmission operations, by the second entity, responsive to the incoming transmission awareness request. For example, this set of operations may be performed: when an RX BT/BLE device advertises preferences and its recaption capabilities to a TX BT/BLE device; or when an RX BT/BLE device sends a coordination request to TX BT/BLE device.

In some example embodiments, the method 600 includes obtaining, by the first entity, the incoming transmission awareness request regarding a later incoming transmission event at block 602 is performed after advertising or coordinating preferences and recaption capabilities for the later incoming transmission event. In some example embodiments, the method 600 includes the second entity acknowledging receipt of the incoming transmission awareness request to the first entity. Without limitation, the incoming transmission operations performed at block 606 include selecting specific packet information, specific channel or channels, specific timing, radio frequency parameters, modem/PHY parameters, RF layer parameters, L2 parameters and/or other parameters for the later incoming transmission event.

With incoming transmission awareness as described herein, BT/BLE device awareness/correlation of parameters for one or more later incoming transmission events (specific packet/info element, a specific channel, specific timing) is performed. As an example, incoming transmission awareness operations may directly notify a specific channel or related controller to wait for an incoming transmission. As another option, incoming transmission awareness operations may indirectly schedule an incoming transmission event on a specific channel/timing. The described incoming transmission awareness provides advantages and value, including: power consumption reductions; coexistence by ignoring bad channels; lower delays; robustness of reception (increase RX probability and reliability); ease of use; flexibility (advanced users can implement custom features such as time-of-flight parameters); and out of band communications (e.g., utilize the time when a BLE connection event is not commencing on a different band).

Without limitation, incoming transmission awareness techniques gives customers that develop BT/BLE devices and related code (e.g., application/host code) the ability to request or coordinate parameters (e.g., specific channel/timing) for later incoming transmission events. In some example embodiments, incoming transmission awareness uses APIs to control/provide awareness of incoming transmission channel/timing information to the BT/BLE device. As an example, application/host/controller APIs may be used to: schedule/trigger packet reception on specific channel/timing; prepare an RX window to receive an incoming transmission; and/or notify other BT/BLE devices of preferred channels/timings for later incoming transmission events. In some example embodiments, a BLE's GATT Profile (e.g., GATT 442 in FIGS. 4 and 5) will contain the "look ahead" information related to later incoming transmission events.

Example use-cases for incoming transmission awareness include: proprietary time-of-flight analysis using specific channels/timings to determine time-of-flight values; implementation of a wireless connection monitor that uses channel/timing information to track the connection and receive packets on known channels/timings; increasing robustness of reception by detecting which channels offer the best reception and requesting to receive important data on those channels only; providing statistics (e.g. which packets were received on a particular channel) for incoming transmissions; and/or receiving packets of a particular type on specific channels/timings. Other use-cases are possible.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A device comprising:

a controller layer comprising a physical (PHY) layer wherein the PHY layer is configurable to:
  - send a coordination request regarding an incoming transmission event; and
  - after sending the coordination request, receive confirmation that the coordination request was received; and a host layer coupled to the controller layer, the host layer configurable to:
  - after the controller layer receives confirmation that the coordination request was received, send an incoming transmission awareness request regarding the incoming transmission event to the controller layer, wherein the PHY layer is further configurable to receive data associated with the incoming transmission event using a communication parameter based on the incoming transmission awareness request.

2. The device of claim 1, wherein the host layer is configurable to send the incoming transmission awareness request to the controller layer via a host-controller interface (HCI).

3. The device of claim 1, wherein the host layer is configurable to send the incoming transmission awareness request using an application programming interface (API) after preferences and reception capabilities for the incoming transmission event are advertised.

4. The device of claim 1, wherein the host layer is configurable to send the incoming transmission awareness request after a first incoming transmission event provides coordination data for the incoming transmission event.

5. The device of claim 1, wherein the incoming transmission awareness request is based on configuration preferences provided by an application.

6. The device of claim 1, wherein the communication parameter comprises a communication channel, wherein the controller layer is configurable to select the communication channel based on the incoming transmission awareness request, and wherein receiving the data associated with the incoming transmission event comprises receiving the data using the selected communication channel.

7. The device of claim 1, wherein the communication parameter comprises a communication channel, wherein the controller layer is configurable to avoid the communication channel based on the incoming transmission awareness request, and wherein receiving the data associated with the incoming transmission event comprises receiving the data using another communication channel.

8. The device of claim 1, wherein the communication parameter comprises a start reception time, wherein the controller layer is configurable to select the start reception time based on the incoming transmission awareness request, and wherein receiving the data associated with the incoming transmission event comprises receiving the data at the start reception time.

9. The device of claim 8, wherein the start reception time is a time in which a connection event is not commencing in a communication channel used for receiving the data.

10. The device of claim 1, wherein the communication parameter further comprises a reception interval, wherein the controller layer is configurable to select the reception interval based on the incoming transmission awareness request, and wherein receiving the data associated with the incoming transmission event comprises receiving the data at the reception interval.

11. The device of claim 1, wherein receiving the data associated with the incoming transmission event comprises receiving the data from a wireless device.

12. The device of claim 1, wherein the controller layer is configurable to provide a notification responsive to the incoming transmission event starting.

13. The device of claim 1, wherein the controller layer is configurable to provide a notification responsive to the incoming transmission event ending.

14. The device of claim 1, wherein the controller layer is configurable to provide a notification responsive to a failure associated with the incoming transmission event.

15. The device of claim 1, wherein the data is received in accordance with a Bluetooth Low Energy (BLE) protocol.

16. The device of claim 1, wherein the device is part of a vehicle, sensor, smartphone, infotainment unit, key fob, or wearable device, body control module (BCM).

17. The device of claim 1, wherein the device is part of a radar, light, or optical sensor.

18. The device of claim 1, wherein the communication parameter comprises one or more of packet information, channel information, timing information, reception configuration, logical link parameters, or restrictions associated with the incoming transmission awareness request.

19. A method comprising:

transmitting, by a first device to a second device, a coordination request regarding an incoming transmission event;

after transmitting the coordination request, receiving, by the first device from the second device, confirmation that the coordination request was received;

after receiving confirmation that the coordination request was received, sending, by a host layer of the first device, an incoming transmission awareness request regarding the incoming transmission event to a controller layer of the first device; and receiving, by the first device from the second device, data associated with the incoming transmission event using a communication parameter based on the incoming transmission awareness request.

20. The method of claim 19, wherein the communication parameter comprises packet information, channel information, timing information, reception configuration, logical link parameters, and restrictions associated with the incoming transmission awareness request.

21. The method of claim 19, wherein transmitting, by the first device to the second device, a coordination request is via a physical (PHY) layer of the first device to the second device, and wherein sending, by the host layer of the first device, the incoming transmission awareness request to the controller layer of the first device is via a host controller interface (HCI) between the host layer and the controller layer of the first device.

* * * * *